US012800831B2

(12) United States Patent
Chiang et al.

(10) Patent No.: US 12,800,831 B2
(45) Date of Patent: Nov. 17, 2026

(54) SILICON PHOTONICS STRUCTURE AND MANUFACTURING METHOD THEREOF

(71) Applicant: United Microelectronics Corp., Hsinchu (TW)

(72) Inventors: Meng Ting Chiang, Taichung City (TW); Kai-Kuang Ho, Hsinchu City (TW); Shing-Ren Sheu, Taoyuan City (TW)

(73) Assignee: United Microelectronics Corp., Hsinchu (TW)

( * ) Notice: Subject to any disclaimer, the term of this patent is extended or adjusted under 35 U.S.C. 154(b) by 420 days.

(21) Appl. No.: 18/454,815

(22) Filed: Aug. 24, 2023

(65) Prior Publication Data

US 2025/0028116 A1 Jan. 23, 2025

(30) Foreign Application Priority Data

Jul. 18, 2023 (CN) ........................ 202310881244.4

(51) Int. Cl.
*G02B 6/136* (2006.01)
*G02B 6/12* (2006.01)

(52) U.S. Cl.
CPC ......... *G02B 6/136* (2013.01); *G02B 6/12002* (2013.01); *G02B 2006/12061* (2013.01)

(58) Field of Classification Search
CPC ................ G02B 6/136; G02B 6/12002; G02B 2006/12061; G02B 6/30; G02B 6/122; G02B 2006/12176
See application file for complete search history.

(56) References Cited

U.S. PATENT DOCUMENTS

2024/0019638 A1* 1/2024 Haase ...................... G02B 6/30

FOREIGN PATENT DOCUMENTS

JP 2016218280 12/2016

* cited by examiner

*Primary Examiner* — John Bedtelyon
(74) *Attorney, Agent, or Firm* — JCIPRNET

(57) ABSTRACT

A silicon photonics structure including a silicon photonics device is provided. The silicon photonics device includes a substrate and a waveguide. The substrate has a first side and a second side opposite to each other, and the waveguide is located on the first side. The width of the first side is greater than the width of the second side. The substrate includes a staircase structure.

7 Claims, 5 Drawing Sheets

SILICON PHOTONICS STRUCTURE AND MANUFACTURING METHOD THEREOF

CROSS-REFERENCE TO RELATED APPLICATION

This application claims the priority benefit of China application serial no. 202310881244.4, filed on Jul. 18, 2023. The entirety of the above-mentioned patent application is hereby incorporated by reference herein and made a part of this specification.

BACKGROUND

Technical Field

The invention relates to a silicon photonics product and a manufacturing method thereof, and particularly relates to a silicon photonics structure and a manufacturing method thereof.

Description of Related Art

In current silicon photonics products, the smaller the distance between the waveguide and the optical fiber device, the less loss of the optical signal. Therefore, how to effectively reduce the distance between the waveguide and the optical fiber device is the goal of continuous efforts.

SUMMARY

The invention provides a silicon photonics structure and a manufacturing method thereof, which can effectively reduce the distance between the waveguide and the optical fiber device.

The invention provides a silicon photonics structure, which includes a silicon photonics device. The silicon photonics device includes a substrate and a waveguide. The substrate has a first side and a second side opposite to each other. The width of the first side is greater than the width of the second side. The substrate includes a staircase structure. The waveguide is located on the first side.

According to an embodiment of the invention, in the silicon photonics structure, the staircase structure may include a first step, a second step, and a third step. The first step may be adjacent to the first side. The third step may be adjacent to the second side. The second step may be located between the first step and the third step.

According to an embodiment of the invention, in the silicon photonics structure, the first step may include a first sidewall and a first tread. The first sidewall may be connected to the first side. The first tread may be connected to the first sidewall. The second step may include a second sidewall and a second tread. The second sidewall may be connected to the first tread. The second tread may be connected to the second sidewall. The third step may include a third sidewall and a third tread. The third sidewall may be connected to the second tread. The third tread may be connected to the third sidewall.

According to an embodiment of the invention, in the silicon photonics structure, the width of the third tread may be greater than the width of the second tread, and the width of the second tread may be greater than the width of the first tread.

According to an embodiment of the invention, in the silicon photonics structure, the height of the second sidewall may be greater than the height of the first sidewall, and the height of the first sidewall may be greater than the height of the third sidewall.

According to an embodiment of the invention, the silicon photonics structure may further include an optical fiber device. The optical fiber device is located on one side of the waveguide and one side of the first step.

According to an embodiment of the invention, in the silicon photonics structure, the optical fiber device may include an optical fiber array.

According to an embodiment of the invention, the silicon photonics structure may further include an adhesive layer. The adhesive layer is located between the first step and the optical fiber device.

According to an embodiment of the invention, in the silicon photonics structure, the silicon photonics device may further include an insulating layer and a cladding layer. The insulating layer is located between the waveguide and the substrate. The cladding layer is located on the waveguide and the insulating layer.

The invention provides a manufacturing method of a silicon photonics structure, which includes the following steps. A silicon photonics device layer is provided. The silicon photonics device layer includes a substrate layer and a waveguide. The substrate layer has a first side and a second side opposite to each other. The waveguide is located on the first side of the substrate layer. A first patterned photoresist layer is formed on the first side. A first etching process is performed on the first side by using the first patterned photoresist layer as a mask to form a first opening in the substrate layer. The first patterned photoresist layer is removed. A second patterned photoresist layer is formed on the second side. A second etching process is performed on the second side by using the second patterned photoresist layer as a mask to form a second opening in the substrate layer. The second patterned photoresist layer is removed. A cutting process is performed on the substrate layer exposed by the second opening by using a cutter to form a third opening in the substrate layer and to form a silicon photonics device. The third opening is connected to the first opening to cut the substrate layer into a substrate. The silicon photonics device includes the substrate and the waveguide. The substrate has the first side and the second side. The substrate includes a staircase structure. The waveguide is located on the first side of the substrate.

According to an embodiment of the invention, in the manufacturing method of the silicon photonics structure, the first etching process is, for example, a dry etching process.

According to an embodiment of the invention, in the manufacturing method of the silicon photonics structure, the second etching process is, for example, a dry etching process or a wet etching process.

According to an embodiment of the invention, in the manufacturing method of the silicon photonics structure, the width of the second opening may be greater than the width of the third opening. The width of the third opening may be greater than the width of the first opening.

According to an embodiment of the invention, in the manufacturing method of the silicon photonics structure, the depth of the third opening may be greater than the depth of the first opening. The depth of the first opening may be greater than the depth of the second opening.

According to an embodiment of the invention, in the manufacturing method of the silicon photonics structure, the silicon photonics device may further include an insulating layer and a cladding layer. The insulating layer is located between the waveguide and the substrate. The cladding layer is located on the waveguide and the insulating layer.

According to an embodiment of the invention, in the manufacturing method of the silicon photonics structure, the silicon photonics device layer may further include an insulating material layer and a cladding material layer. The insulating material layer is located between the waveguide and the substrate layer. The cladding material layer is located on the waveguide and the insulating material layer.

According to an embodiment of the invention, the manufacturing method of the silicon photonics structure may further include the following step. The first etching process is performed on the cladding material layer to form the cladding layer.

According to an embodiment of the invention, the manufacturing method of the silicon photonics structure may further include the following step. The first etching process is performed on the insulating material layer to form the insulating layer.

According to an embodiment of the invention, in the manufacturing method of the silicon photonics structure, the staircase structure may include a first step, a second step, and a third step. The first step may be adjacent to the first side. The third step may be adjacent to the second side. The second step may be located between the first step and the third step. The width of the first side may be greater than the width of the second side.

According to an embodiment of the invention, the manufacturing method of the silicon photonics structure may further include the following step. The optical fiber device may be connected to the first step by an adhesive layer.

Based on the above description, in the silicon photonics structure according to the invention, the silicon photonics device includes the substrate and the waveguide, and the substrate has the first side and the second side opposite to each other, wherein the width of the first side is greater than the width of the second side, and the substrate includes the staircase structure. Since the waveguide is located on the first side with a larger width, the distance between the waveguide and the optical fiber device can be effectively reduced, thereby reducing the loss of the optical signal. In addition, in the manufacturing method of the silicon photonics structure according to the invention, the first opening is formed by the first etching process, so that the first opening with the required specification can be accurately formed, and the distance between the waveguide and the optical fiber device can be effectively reduced, thereby reducing the loss of the optical signal. Furthermore, in the manufacturing method of the silicon photonics structure according to the invention, the second opening is formed by the second etching process, so that the second opening with the required specification can be accurately formed, and the second opening can be used as a cutting mark to facilitate the subsequent cutting process.

In order to make the aforementioned and other objects, features and advantages of the invention comprehensible, several exemplary embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The embodiments are described in detail below with reference to the accompanying drawings, but the embodiments are not intended to limit the scope of the invention. For the sake of easy understanding, the same components in the following description will be denoted by the same reference symbols. In addition, the drawings are for illustrative purposes only and are not drawn to the original dimensions. In fact, the dimensions of the various features may be arbitrarily increased or reduced for clarity of discussion.

FIG. 1A to FIG. 1E are cross-sectional views of a manufacturing process of a silicon photonics structure according to some embodiments of the invention.

Figure 1A:
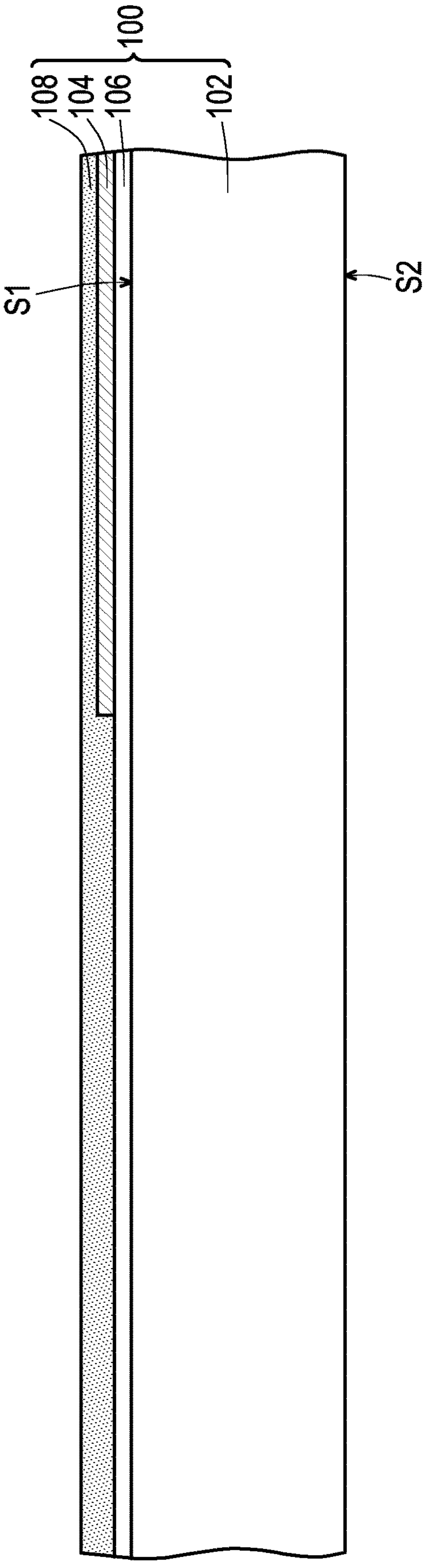
FIG. 1A to FIG. 1E are cross-sectional views of a manufacturing process of a silicon photonics structure according to some embodiments of the invention.

Referring to FIG. 1A, a silicon photonics device layer 100 is provided. The silicon photonics device layer 100 includes a substrate layer 102 and a waveguide 104. The substrate layer 102 has a first side S1 and a second side S2 opposite to each other. In some embodiments, the material of the substrate layer 102 may be a semiconductor material such as silicon. The waveguide 104 is located on the first side S1 of the substrate layer 102. The waveguide 104 may be used as an optical waveguide. In some embodiments, the material of the waveguide 104 may be a semiconductor material such as silicon.

The silicon photonics device layer 100 may further include at least one of an insulating material layer 106 and a cladding material layer 108. The insulating material layer 106 is located between the waveguide 104 and the substrate layer 102. In some embodiments, the insulating material layer 106 may be a buried oxide layer. In some embodiments, the material of the insulating material layer 106 is, for example, silicon oxide. The cladding material layer 108 is located on the waveguide 104 and the insulating material layer 106. In some embodiments, the material of the cladding material layer 108 is, for example, silicon oxide.

Figure 1B:
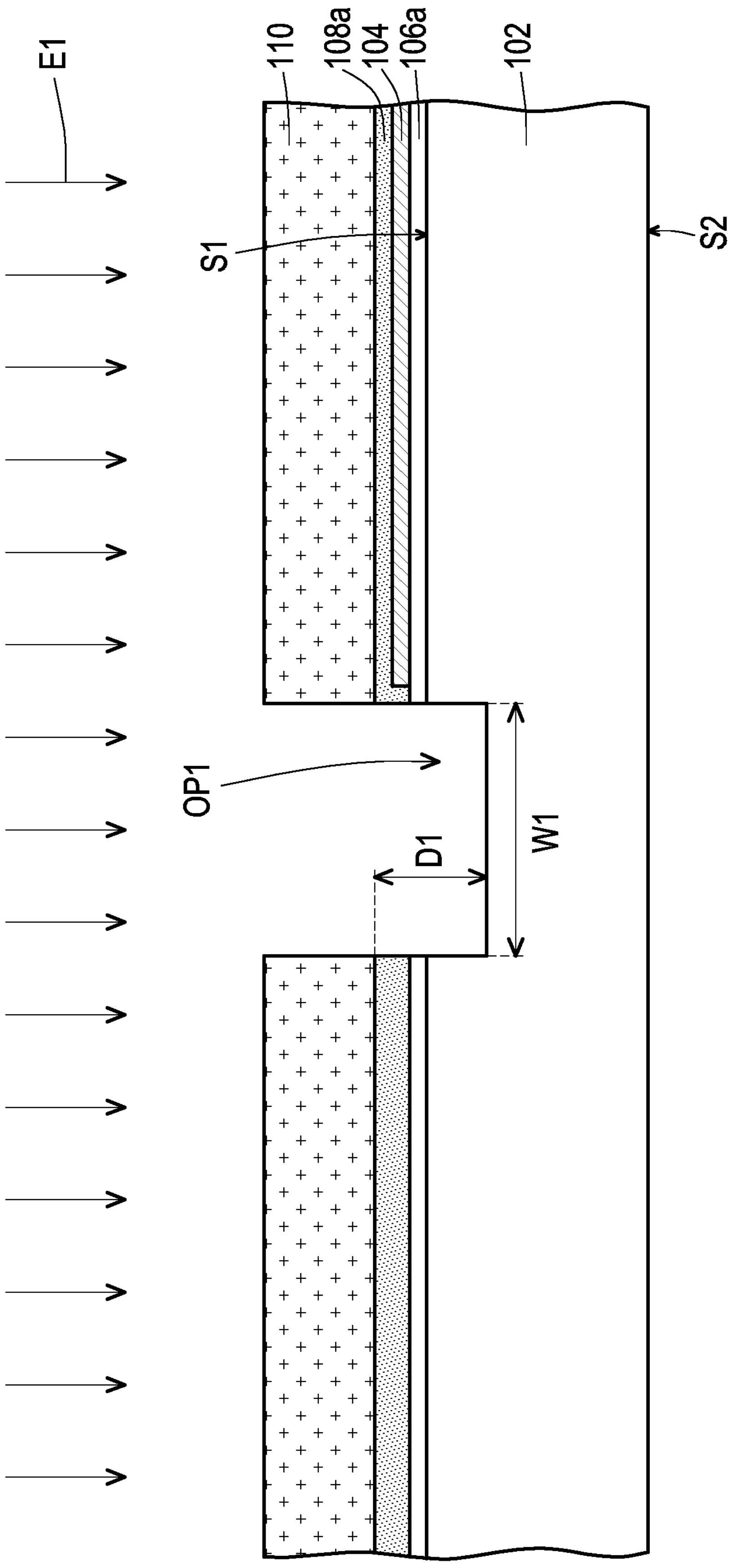

Referring to FIG. 1B, a first patterned photoresist layer 110 is formed on the first side S1. In some embodiments, the first patterned photoresist layer 110 may be formed on the cladding material layer 108. In some embodiments, the first patterned photoresist layer 110 may be formed by a lithography process.

A first etching process E1 is performed on the first side S1 by using the first patterned photoresist layer 110 as a mask to form a first opening OP1 in the substrate layer 102. In some embodiments, the first etching process E1 may be performed on the cladding material layer 108 to form a cladding layer 108*a*. In some embodiments, the first etching process E1 may be performed on the insulating material layer 106 to form an insulating layer 106*a*. In some embodiments, the first etching process E1 is, for example, a dry etching process (e.g., inductively coupled plasma (ICP) etching). In some embodiments, the width W1 of the first opening OP1 is, for example, 10 μm to 20 μm, and the depth D1 of the first opening OP1 is, for example, 100 μm to 150 μm.

Figure 1C:
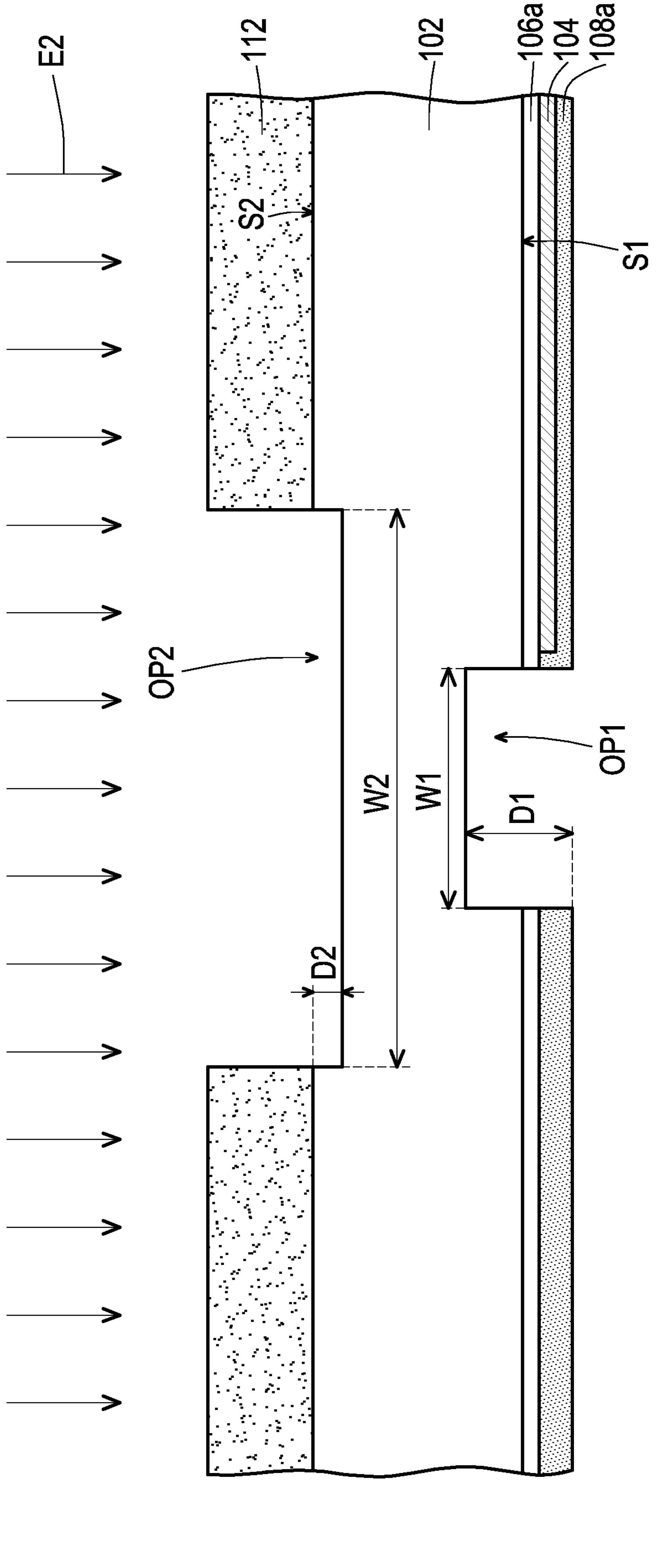

Referring to FIG. 1C, the first patterned photoresist layer 110 is removed. In some embodiments, the method of removing the first patterned photoresist layer 110 is, for example, a dry stripping method or a wet stripping method.

A second patterned photoresist layer 112 is formed on the second side S2. In some embodiments, the second patterned photoresist layer 112 may be formed by a lithography process.

A second etching process E2 is performed on the second side S2 by using the second patterned photoresist layer 112 as a mask to form a second opening OP2 in the substrate layer 102. In some embodiments, the second etching process E2 is, for example, a dry etching process (e.g., ICP etching) or a wet etching process.

In some embodiments, the width W2 of the second opening OP2 may be greater than the width W1 of the first opening OP1. In some embodiments, the depth D1 of the first opening OP1 may be greater than the depth D2 of the second opening OP2. In some embodiments, the width W2 of the second opening OP2 is, for example, 80 μm to 100 μm, and the depth D2 of the second opening OP2 is, for example, 5 μm to 10 μm.

Figure 1D:
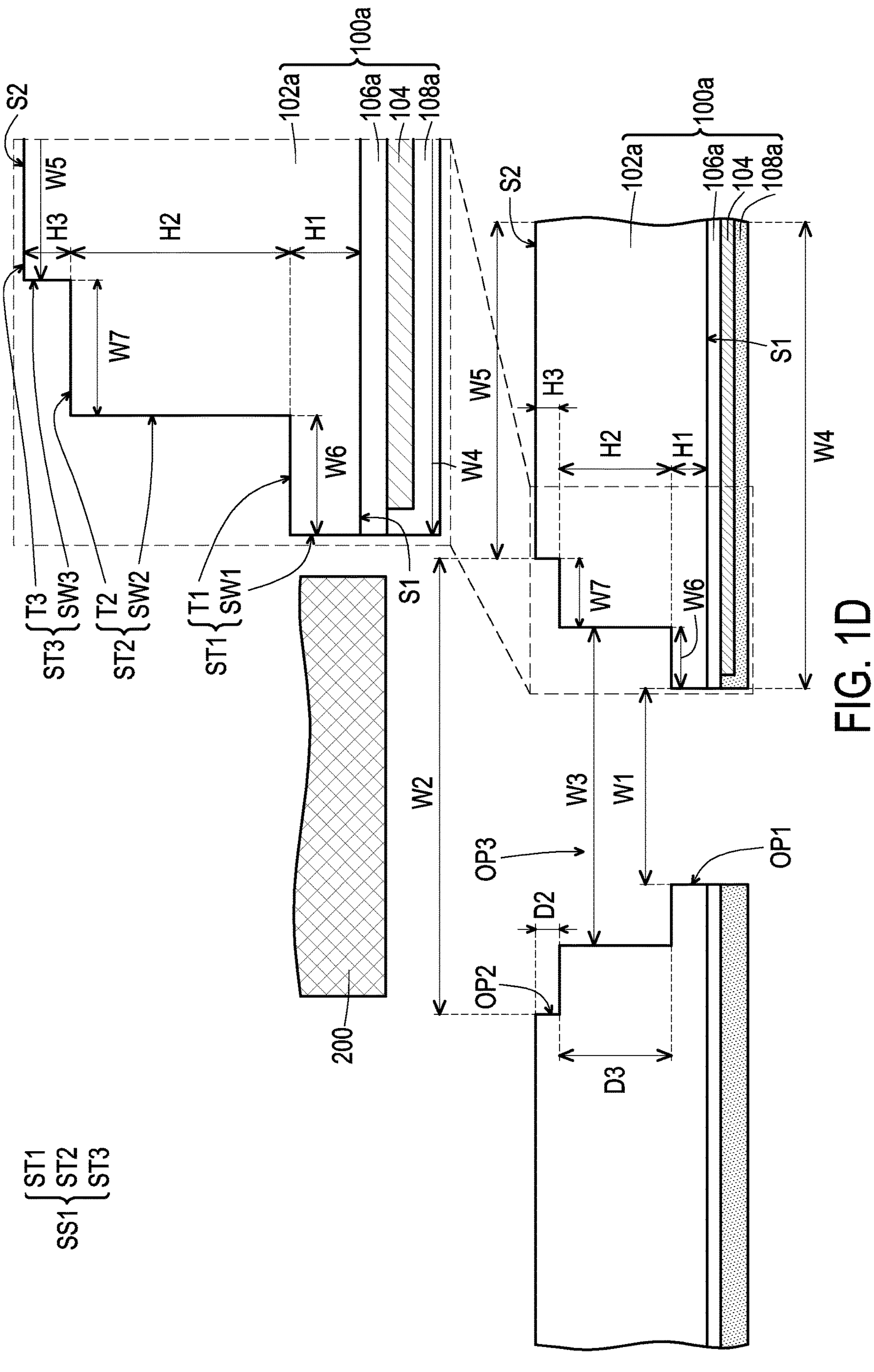

Referring to FIG. 1D, the second patterned photoresist layer 112 is removed. In some embodiments, the method of removing the second patterned photoresist layer 112 is, for example, a dry stripping method or a wet stripping method.

A cutting process is performed on the substrate layer 102 exposed by the second opening OP2 by using a cutter 200 to form a third opening OP3 in the substrate layer 102 and to form a silicon photonics device 100*a*. The third opening OP3 is connected to the first opening OP1 to cut the substrate layer 102 into a substrate 102*a*. In some embodiments, the material of cutter 200 may include diamond or metal.

In some embodiments, the width W2 of the second opening OP2 may be greater than the width W3 of the third opening OP3, and the width W3 of the third opening OP3 may be greater than the width W1 of the first opening OP1. In some embodiments, the depth D3 of the third opening OP3 may be greater than the depth D1 of the first opening OP1 (FIG. 1C). In some embodiments, the width W3 of the third opening OP3 is, for example, 45 μm to 50 μm, and the depth D3 of the third opening OP3 is, for example, 610 μm to 630 μm.

The silicon photonics device 100*a* includes the substrate 102*a* and the waveguide 104. The substrate 102*a* has the first side S1 and the second side S2. The width W4 of the first side S1 of the substrate 102*a* may be greater than the width W5 of the second side S2 of the substrate 102*a*. In some embodiments, the substrate 102*a* may be a semiconductor substrate such as a silicon substrate.

The substrate 102*a* includes a staircase structure SS1. The staircase structure SS1 may include a first step ST1, a second step ST2, and a third step ST3. The first step ST1 may be adjacent to the first side S1. The third step ST3 may be adjacent to the second side S2. The second step ST2 may be located between the first step ST1 and the third step ST3. The first step ST1 may include a first sidewall SW1 and a first tread T1. The first sidewall SW1 may be connected to the first side S1. The first tread T1 may be connected to the first sidewall SW1. The second step ST2 may include a second sidewall SW2 and a second tread T2. The second sidewall SW2 may be connected to the first tread T1. The second tread T2 may be connected to the second sidewall SW2. The third step ST3 may include a third sidewall SW3 and a third tread T3. The third sidewall SW3 may be connected to the second tread T2. The third tread T3 may be connected to the third sidewall SW3. In some embodiments, the second side S2 may be used as the third tread T3.

In some embodiments, the width W5 of the third tread T3 may be greater than the width W7 of the second tread T2, and the width W7 of the second tread T2 may be greater than the width W6 of the first tread T1. In some embodiments, the width W6 of the first tread T1 may be 17 μm to 20 μm, and the width W7 of the second tread T2 may be 17.5 μm to 27.5 μm. In some embodiments, the height H2 of the second sidewall SW2 may be greater than the height H1 of the first sidewall SW1, and the height H1 of the first sidewall SW1 may be greater than the height H3 of the third sidewall SW3.

The waveguide 104 is located on the first side S1 of the substrate 102*a*. Since the waveguide 104 is located on the first side S1 with a larger width, the distance between the waveguide 104 and the optical fiber device 114 (FIG. 1E) can be effectively reduced, thereby reducing the loss of the optical signal.

The silicon photonics device 100*a* may further include at least one of the insulating layer 106*a* and the cladding layer 108*a*. The insulating layer 106*a* is located between the waveguide 104 and the substrate 102*a*. In some embodiments, the material of the insulating layer 106*a* is, for example, silicon oxide. The cladding layer 108*a* is located on the waveguide 104 and the insulating layer 106*a*. In some embodiments, the material of the cladding layer 108*a* is, for example, silicon oxide.

Figure 1E:
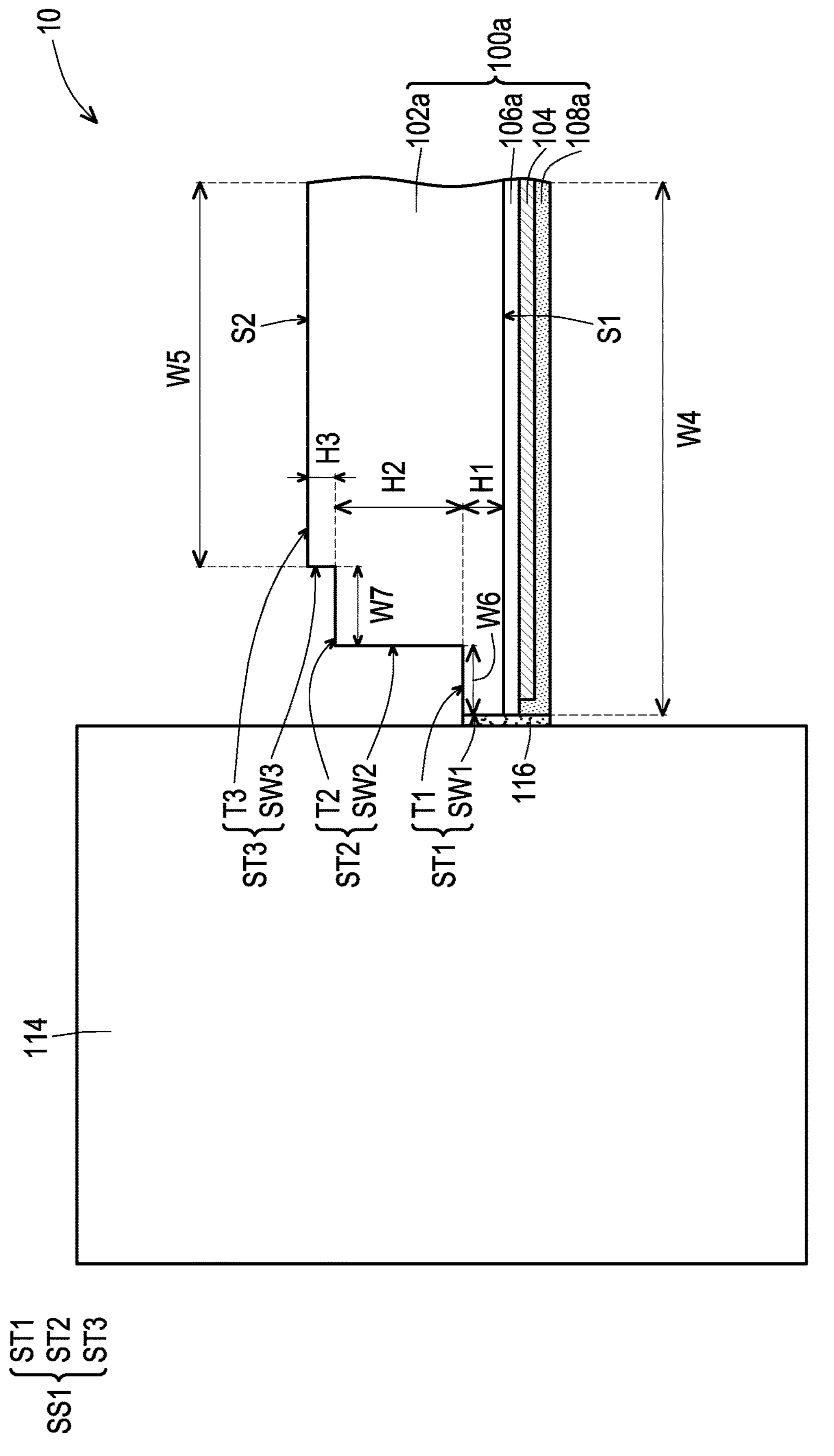

Referring to FIG. 1E, an optical fiber device 114 may be connected to the first step ST1 by an adhesive layer 116. That is, the adhesive layer 116 may be located between the optical fiber device 114 and the first step ST1. In some embodiments, the adhesive layer 116 may be further located between the optical fiber device 114 and the insulating layer 106*a*. In some embodiments, the adhesive layer 116 may be further located between the optical fiber device 114 and the cladding layer 108*a*. In some embodiments, the optical fiber device 114 may include an optical fiber array. In some embodiments, the adhesive layer 116 may be ultraviolet (UV) glue.

Hereinafter, the silicon photonics structure 10 of the above embodiments will be described with reference to FIG. 1E. In addition, although the method for forming the silicon photonics structure 10 is described by taking the above method as an example, the invention is not limited thereto.

Referring to FIG. 1E, a silicon photonics structure 10 includes a silicon photonics device 100*a*. The silicon photonics device 100*a* includes a substrate 102*a* and a waveguide 104. The substrate 102*a* has a first side S1 and a second side S2 opposite to each other. The width W4 of the first side S1 is greater than the width W5 of the second side S2. The substrate 102*a* includes a staircase structure SS1. The waveguide 104 is located on the first side S1. In some embodiments, the silicon photonics device 100*a* may further include at least one of the insulating layer 106*a* and the cladding layer 108*a*. The insulating layer 106*a* is located between the waveguide 104 and the substrate 102*a*. The cladding layer 108*a* is located on the waveguide 104 and the insulating layer 106*a*. In addition, although not shown in the figure, there may be a circuit structure on the insulating layer 106*a*, and the optical signal may be transmitted between the circuit structure and the waveguide 104.

In some embodiments, the silicon photonics structure 10 may further include an optical fiber device 114. The optical fiber device 114 is located on one side of the waveguide 104 and one side of the first step ST1. In some embodiments, the silicon photonics structure 10 may further include an adhesive layer 116. The adhesive layer 116 is located between the first step ST1 and the optical fiber device 114.

In addition, the details (e.g., the material, the arrangement, the forming method, and the effect) of each component in the silicon photonics structure 10 have been described in detail in the above embodiments, and the description thereof is not repeated here.

Based on the above embodiments, in the silicon photonics structure 10, the silicon photonics device 100*a* includes the substrate 102*a* and the waveguide 104, and the substrate 102*a* has the first side S1 and the second side S2 opposite to each other, wherein the width W4 of the first side S1 is greater than the width W5 of the second side S2, and the substrate 102*a* includes the staircase structure SS1. Since the waveguide 104 is located on the first side S1 with a larger width, the distance between the waveguide 104 and the optical fiber device 114 can be effectively reduced, thereby reducing the loss of the optical signal. In addition, in the manufacturing method of the silicon photonics structure 10, the first opening OP1 is formed by the first etching process E1, so that the first opening OP1 with the required specification can be accurately formed, and the distance between the waveguide 104 and the optical fiber device 114 can be effectively reduced, thereby reducing the loss of the optical signal. Furthermore, in the manufacturing method of the silicon photonics structure 10, the second opening OP2 is formed by the second etching process E2, so that the second opening OP2 with the required specification can be accurately formed, and the second opening OP2 can be used as a cutting mark to facilitate the subsequent cutting process.

In summary, in the silicon photonics structure of the aforementioned embodiments, the waveguide is located on the wider surface of the substrate, so that the distance between the waveguide and the optical fiber device can be effectively reduced, thereby reducing the loss of the optical signal. In addition, in the manufacturing method of the silicon photonics structure of the aforementioned embodiments, the silicon photonics device with the required specification can be obtained by the etching process, so that the distance between the waveguide and the optical fiber device can be effectively reduced, thereby reducing the loss of the optical signal. Furthermore, in the manufacturing method of the silicon photonics structure of the aforementioned embodiments, the cutting mark with the required specification can be obtained by the etching process, so as to facilitate the subsequent cutting process.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A silicon photonics structure, comprising a silicon photonics device, wherein the silicon photonics device comprises:

a substrate having a first side and a second side opposite to each other, wherein a width of the first side is greater than a width of the second side, and the substrate comprises a staircase structure; and a waveguide located on the first side, wherein in a stacking direction of the waveguide, the first side, and the second side, the first side is located between the waveguide and the second side, the staircase structure comprises a first step, a second step, and a third step, the first step is adjacent to the first side, the third step is adjacent to the second side, the second step is located between the first step and the third step, the first step comprises a first sidewall and a first tread, the first sidewall is connected to the first side, the first tread is connected to the first sidewall, the second step comprises a second sidewall and a second tread, the second sidewall is connected to the first tread, the second tread is connected to the second sidewall, the third step comprises a third sidewall and a third tread, the third sidewall is connected to the second tread, and the third tread is connected to the third sidewall.

2. The silicon photonics structure according to claim 1, wherein a width of the third tread is greater than a width of the second tread, and the width of the second tread is greater than a width of the first tread.

3. The silicon photonics structure according to claim 1, wherein a height of the second sidewall is greater than a height of the first sidewall, and the height of the first sidewall is greater than a height of the third sidewall.

4. The silicon photonics structure according to claim 1, further comprising:

an optical fiber device located on one side of the waveguide and one side of the first step.

5. The silicon photonics structure according to claim 4, wherein the optical fiber device comprises an optical fiber array.

6. The silicon photonics structure according to claim 4, further comprising:

an adhesive layer located between the first step and the optical fiber device.

7. The silicon photonics structure according to claim 1, wherein the silicon photonics device further comprises:

an insulating layer located between the waveguide and the substrate; and a cladding layer located on the waveguide and the insulating layer.

* * * * *